US007655067B2

(12) United States Patent
Lucas et al.

(10) Patent No.: US 7,655,067 B2
(45) **Date of Patent: *Feb. 2, 2010**

(54) METHOD FOR PROCESSING ALUMINIUM IN A ROTARY OR A REVERBERATING FURNACE

(75) Inventors: Nicolas Lucas, Lechesnay (FR); Bernard Zamuner, Garches (FR)

(73) Assignee: L'Air Liquide-Societe Anonyme a Directoire et Conseil de Surveillande pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/589,935

(22) PCT Filed: Feb. 7, 2005

(86) PCT No.: PCT/FR2005/050074

§ 371 (c)(1), (2), (4) Date: Aug. 18, 2006

(87) PCT Pub. No.: WO2005/085732

PCT Pub. Date: Sep. 15, 2005

(65) Prior Publication Data

US 2007/0171954 A1 Jul. 26, 2007

(30) Foreign Application Priority Data

Feb. 25, 2004 (FR) .................................. 04 50351

(51) Int. Cl.
*C22B 21/00* (2006.01)

(52) U.S. Cl. .............................. 75/678; 75/385; 75/672

(58) Field of Classification Search ................... 75/680, 75/678, 385, 672; 373/153
See application file for complete search history.

(56) References Cited

U.S. PATENT DOCUMENTS 3,759,702 A 9/1973 Horak (Continued)

FOREIGN PATENT DOCUMENTS

| | | | |
|---|---|---|---|
| EP | 0 962 540 | | 12/1999 |
| EP | 1 243 663 | | 9/2002 |
| WO | WO 02 20859 | | 3/2002 |
| WO | WO 03056044 | * | 7/2003 |
| WO | WO 2004099453 | * | 11/2004 |

OTHER PUBLICATIONS

Paget M.W., et al. *A novel burner retrofit used to increase productivity in an aluminum rotary furnace.* International Symposium Recycling of Metals and Engineered Materials, XX, XX, 1990, pp. 671-678.

*Primary Examiner*—Roy King
*Assistant Examiner*—Jie Yang
(74) *Attorney, Agent, or Firm*—Christopher J. Cronin

(57) ABSTRACT

The invention relates to a method for processing aluminum in a furnace consisting in introducing an aluminum-containing material and possibly one or several types of salt into the furnace, melting said material by heating with the aid of at least one burner supplied with a combustive material and fuel in such a way that a molten aluminum possibly covered with a slag containing, in particular alumina and at least one salt is produced and in measuring a carbon monoxide and/or hydrogen concentration in the furnace atmosphere or in a smoke at the exit of the furnace. Oxygen content in the combustive material supplying at least one burner is greater than 10% by volume, preferably greater than 21% by volume. The inventive method also involves a final phase of reduction of the molten aluminum oxydation during which the fuel flow rate is substantially constant while the injected combustive flow rate is controlled at a value ranging from 3 to 15% by volume which is greater than a CO concentration in the furnace and/or in the smoke without control.

14 Claims, 3 Drawing Sheets

U.S. PATENT DOCUMENTS

Figure 1:
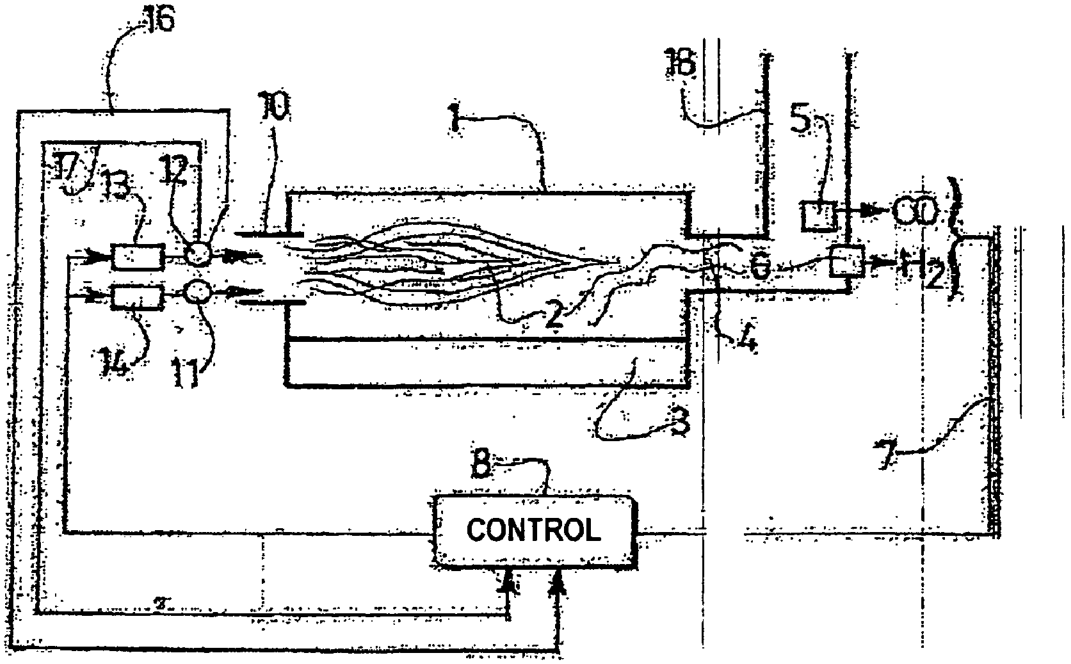

| | | | | |
|---|---|---|---|---|
| 5,563,903 | A | 10/1996 | Jebrail et al. | |
| 5,616,167 | A * | 4/1997 | Eckert | 75/678 |
| 6,245,122 | B1 * | 6/2001 | Meyers | 75/385 |
| 6,247,416 | B1 | 6/2001 | Beaudoin et al. | |
| 2004/0012129 | A1 | 1/2004 | Summer | |
| 2005/0103159 | A1 * | 5/2005 | Ducrocq | 75/385 |
| 2007/0034054 | A1 * | 2/2007 | Allemand et al. | 75/385 |

OTHER PUBLICATIONS

Mihalcea, R.M. et al. *Diode laser sensor for measurements of CO, $CO_2$, and $CH_4$ in combustion flows*. Applied Optics, Optical Society of America, Washington, US, vol. 36, No. 33, Nov. 20, 1997, pp. 8745-8752.

Docquier N. et al. *Combustion control and sensors: A review*. Progress in Energy and Combustion Science, Elsevier Science Publishers, Amsterdam, NL, vol. 28, No. 2, 2002, pp. 107-150.

* cited by examiner

METHOD FOR PROCESSING ALUMINIUM IN A ROTARY OR A REVERBERATING FURNACE

The present invention relates to a method for processing aluminum in a furnace, in which an aluminum-containing material and, optionally, one or more salts and/or slag and/or recycled dross, are introduced into the furnace, this material is melted by heating using at least one burner supplied with oxidizer and with fuel, in order to obtain molten aluminum possibly covered with a slag comprising, in particular, alumina, and the carbon monoxide and/or hydrogen concentration is measured in the furnace atmosphere or in the flue gases.

In the field of secondary aluminum melting, this operation is carried out in a rotary or reverberating furnace. Although this melting process may be continuous, it is usually carried out in batches: the materials are charged into the furnace, in one or more successive cycles, before the molten metal is poured toward its place of use. For this purpose, the molten metal must have a temperature of about 740° C. Above 750° C., the rate of oxidation of the molten aluminum increases considerably, and almost exponentially.

During a melting cycle, the initial period can first be distinguished, when the materials are solid, allowing the absorption of a large quantity of heat, with the aluminum melting at about 660° C.

Irrespective of the type of furnace used, a slag or "dross" is found on the melt surface. A distinction is normally drawn between, on the one hand, what is called "black" dross, which is a mixture of salts (if the process uses salt), of various waste solid organic compounds (polycyclic aromatic hydrocarbons, soot, etc.), generated by the pyrolysis of the organic, and more generally, nonmetallic materials initially present in the charge, of aluminum oxide and aluminum imprisoned in the oxide, and, on the other hand what is called "white" dross, composed exclusively of aluminum oxides and aluminum, produced in the furnaces processing "clean" charges consisting exclusively of metal alloys intended for melting. It should be observed that the production of "black" dross is accompanied by the emission, in the flue gases, of large quantities of volatile organic compounds (VOC), rich in unburnt hydrocarbons.

This slag or dross contains a certain quantity of lost or oxidized metal also called "loss on ignition" which represents a non-negligible loss of material for the aluminum producer, and which should be reduced to the minimum in order to increase the profitability of the melting process. To reduce this oxidation, it is known to maintain the temperature of the aluminum melt to a value below about 750° C. However, this method remains empirical, because hot spots may appear on the surface, causing local oxidation.

Other known solutions prevent the oxidation by decreasing the contact of the metal surface with an oxidant.

Thus, document JP 58-227706 proposes to use the measurement of the CO and $H_2$ contents in the flue gases to ensure that, in a nonferrous metal smelter, the burners installed operate in substoechiometric mode in a range of values of the ratio of the oxidant to fuel flow rate ranging between 95% and 100%, part of the fuel remaining unconsumed.

Document EP 962 540 describes a combustion process for melting a metal in a furnace, in which an oxygen rich gas is sent to the furnace, above the flame of a burner, in contact with the liquid metal.

The burner, operating in substoechiometric mode, produces a reducing flame that creates a barrier between the oxygen rich gas and the melt surface.

Document U.S. Pat. No. 5,563,903 describes a method in which an inert or reducing gas creates a barrier between the aluminum melt surface and a combustion zone located in the upper part of the furnace.

Document U.S. Pat. No. 3,759,702 describes a method in which the melting initially takes place in the open air, with a burner moving above the surface of the materials to be melted. The burner flame is slightly substoechiometric, hence reducing.

All these methods yield incomplete results and are applied throughout the duration of the melting, and not only when a risk of aluminum oxidation exists.

There is a need today for a method for processing aluminum that is applicable even if the first phase does not produce "black" dross and hence high VOC emissions, while limiting the oxidation of the aluminum during the final phase of the method.

The method of the invention serves to solve the problem stated and decrease the formation of aluminum oxides.

It is characterized in that the oxidizer supplied to at least one burner comprises over 10% by volume of oxygen, preferably over 21% by volume of oxygen, and in that the method comprises a final phase for decreasing the oxidation of the aluminum, during which the oxidizer flow rate is substantially constant while the flow rate of fuel injected into at least one burner is a function of the carbon monoxide and/or hydrogen concentration in the atmosphere or the flue gases or vice versa, (that is, the fuel flow rate is substantially constant and the oxidizer flow rate depends on the CO and/or $H_2$ concentration comprised within the same limits as those defined below), this carbon monoxide and/or hydrogen concentration being between 3 vol % and 15 vol % (vice versa means the possibility in which the fuel flow rate is constant and the oxidizer flow rate depends on the CO and/or $H_2$ concentration).

Preferably, the oxidizer comprises over 88 vol % of $O_2$, preferably over 95 vol % of $O_2$. More preferably, the oxidizer is industrially pure oxygen.

The fuel may be any hydrocarbon or a light or heavy fuel oil (with an appropriate fuel oil spray system in the burner), and preferably natural gas, methane, propane, etc. is used. The volumetric ratio of oxygen to fuel is maintained between 1 and 5, preferably between 1.5 and 3.

According to one variant of the invention, the CO and/or $H_2$ concentration is maintained substantially constant throughout this oxidation limitation phase at a value of between 6 vol % and 10 vol % (the setpoint C2 during this final phase is therefore preferably set at a value within this range).

In general, the oxidation limitation phase is preceded by a VOC combustion phase during which substantially all the organic compounds present in the material are destroyed by pyrolysis, possibly (but not necessarily) followed by a stabilization phase.

Preferably, the VOC combustion phase terminates when the value of the ratio R of the volumetric flow rate of oxygen contained in the oxidizer to the volumetric flow rate of fuel during this phase falls below a threshold value S, defined below. In general, to contend with temporary fluctuations, the conditions of this hydrocarbon combustion phase are maintained for a further period $\Delta t$ (between 5% and 20% of the hydrocarbon combustion phase in question) in order to confirm the passage of a value $R<S$, before entering the second phase by changing the setpoint (from a value C1 to a value C2) of the CO measured in the furnace or the flue gases, (considering the possible fluctuations of the variations in the CO concentration, as exemplified in FIG. 2, for example). This phase of duration $\Delta t$ is referred to below as the detection phase.

According to a preferred embodiment of the invention, the method comprises two phases (which can be repeated several times before the liquid aluminum is poured) possibly separated by a generally short detection phase, intended to confirm the complete destruction of the organic compounds.

Preferably, during the first phase, the CO concentration in the furnace atmosphere and/or the flue gases, is between 0.1 vol % and 5 vol % (setpoint C1). The lower limit is in fact determined so that the flue gases (or the atmosphere) contain a maximum of 1000 ppm of oxygen.

In general, it has been found that a CO value of about 0.5 vol % is appropriate. During this first phase, the goal is to obtain the least possible CO in the atmosphere, that is, to adjust the setpoint C1 of the CO concentration at the lowest possible value in the 0.1 vol % to 5 vol % interval, while preserving a nonoxidizing atmosphere in the furnace.

In the absence of control, the CO and/or $H_2$ concentration rises above the setpoint C1 selected above. Conversely, during the final phase, the $H_2$ and/or CO concentration (if the invention is not applied) is lower than the setpoint C2, and one of the goals of the invention is to increase this concentration.

Thus in the initial phase, it is generally advantageous, using the regulation of the setpoint C1, to decrease this CO and/or $H_2$ concentration, while in the final phase, the regulation of the setpoint C2 is used to increase the CO and/or $H_2$ concentration.

According to the invention, the transition from one phase to the other is based on the detection of a durable variation of the ratio R ((volumetric oxygen flow rate)/(volumetric fuel flow rate)=R) going from a value above the threshold S to a value below the threshold S.

The threshold S of the ratio R is defined by prior tests on the furnace in which the invention is implemented, as follows:

- the setpoint C1 to which the CO concentration in the flue gases and/or the atmosphere is regulated (using a variation of the ratio R) is set at the lowest possible value for the furnace tested, its charge (usual) and the CO detector used (generally a laser diode according to the invention). This value is often about 0.1 vol %. With the furnace having a charge as normally processed, the CO value is adjusted to this very low setpoint: after a certain interval, the ratio of the volumetric oxygen/fuel flow rates is stabilized. The ratio R at which this stabilization is obtained is the threshold S defined above.

Thus in the method of the invention, the CO and/or $H_2$ is regulated during the first phase (combustion of volatile organic compounds VOCs) about a setpoint of between 0.1 vol % and 5 vol % (0.5 vol % is often satisfactory), and the ratio R defined above is measured. When R decreases to less than S, regulation is generally continued to the setpoint C1, and then, after a few more minutes (after making sure that the phase has changed, that is, that all the VOCs are burnt), the setpoint is changed to a new setpoint C2 of between 3 vol % and 15 vol %, preferably between 6 vol % and 10 vol %, the beginning of the final phase, in which the ratio R remains below S until the molten metal is poured.

On the contrary, after a certain period in the final phase, aluminum waste (cans, etc.) can be reintroduced in order to regenerate an initial phase in which regulation again proceeds about the setpoint C1, and then, as previously, about the setpoint C2.

According to a variant of the invention only comprising one final phase (clean charge without VOC emission), regulation is directly carried out about a setpoint C2 of between 3 vol % and 15 vol % of CO, a value higher than the CO concentration in the same furnace with the same charge, in the absence of regulation to a setpoint by CO and/or $H_2$.

The aluminum oxidation limitation phase terminates with the reintroduction of a new charge of aluminum-containing material in the furnace, or with the pouring of the liquid aluminum toward its point of use.

In the context of the invention, the aluminum-containing material may be in particular, for example, aluminum in ingots, chips from the turning of aluminum parts, beverage and food cans, scrap, production waste, dross, aluminum-containing slag, and in general, any aluminum-containing material. Obviously, the invention also applies to liquid aluminum temperature-holding furnaces.

Figure 2:
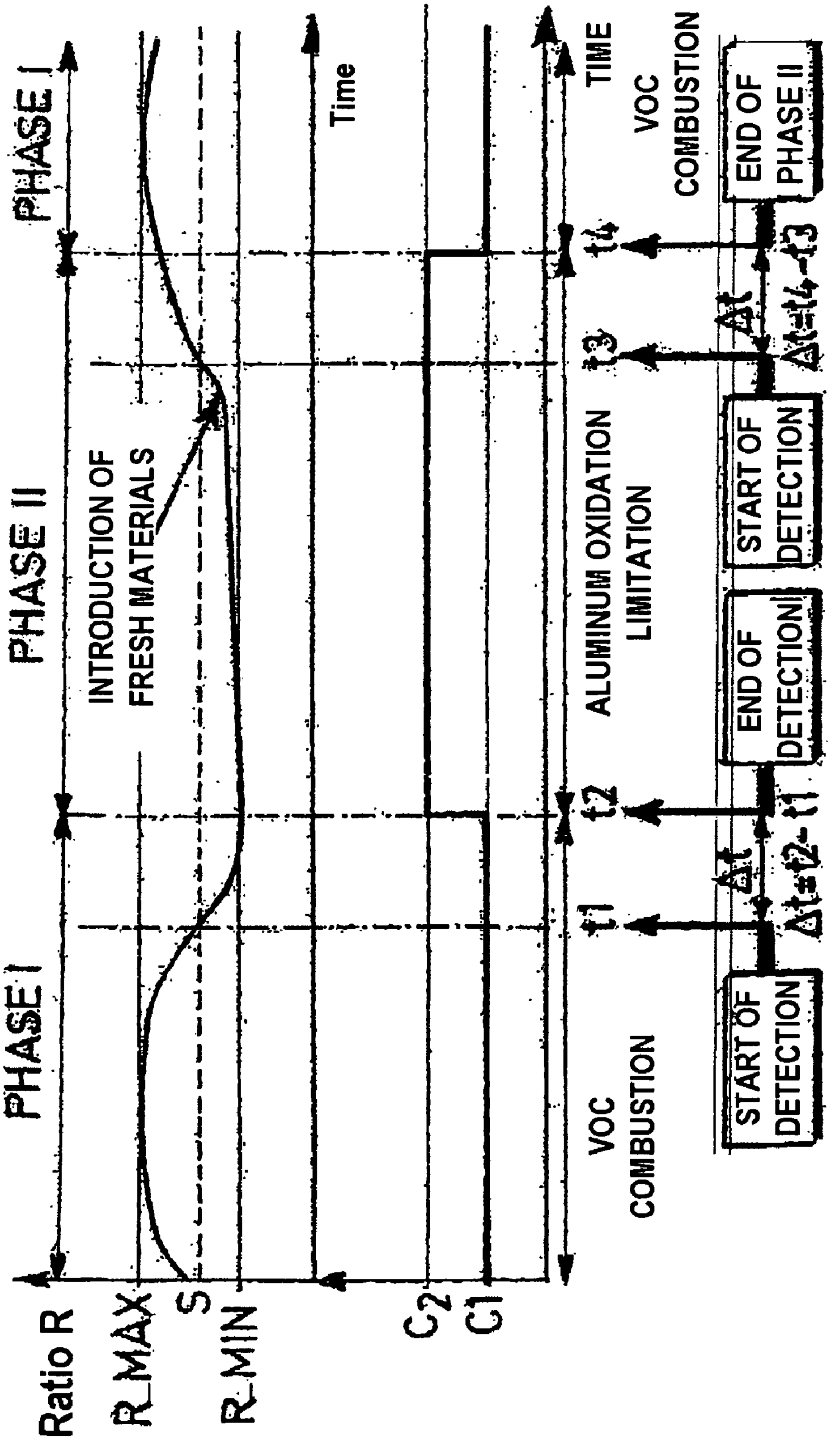
Figure 3:
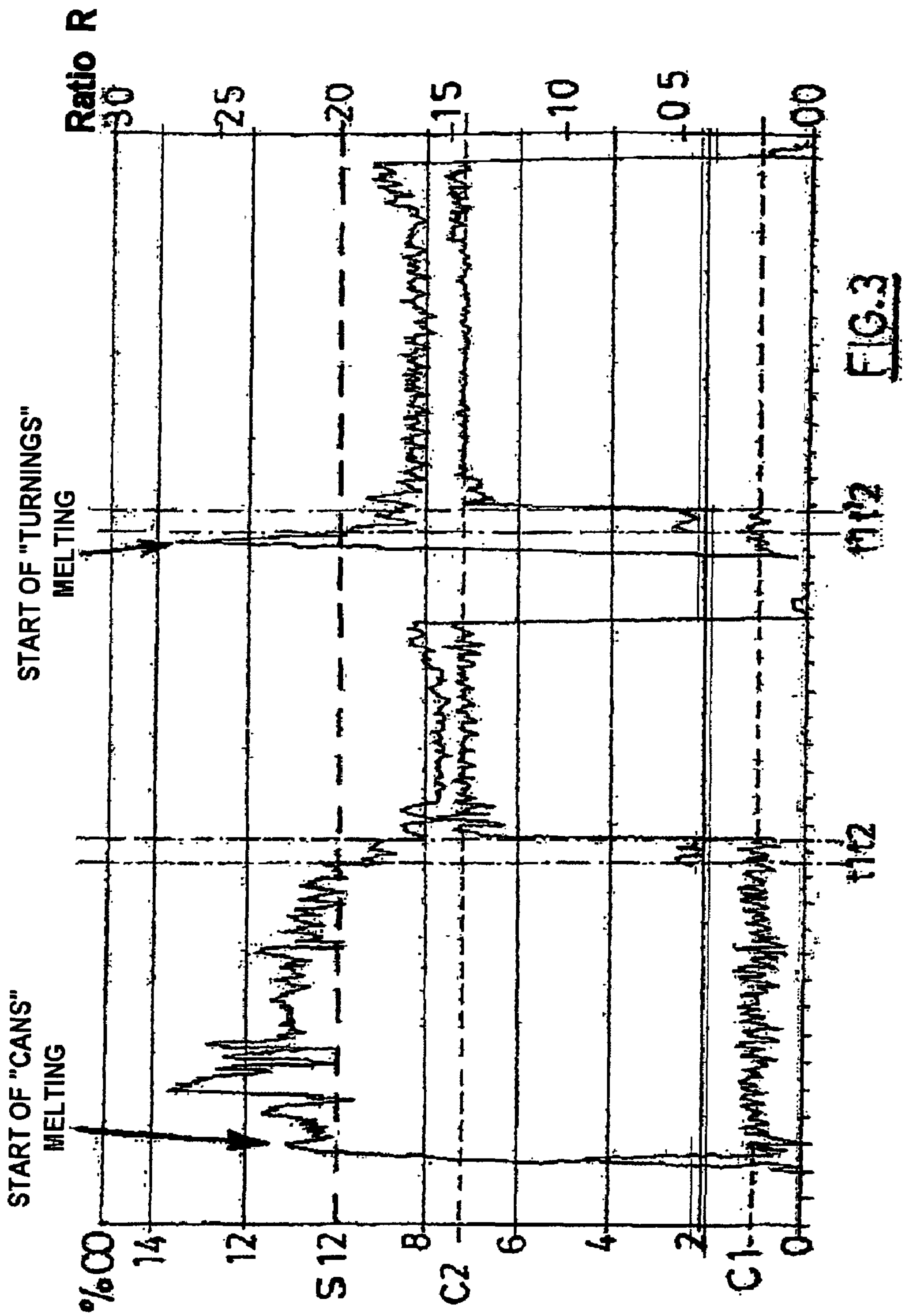

The invention will be better understood from the following embodiments, provided as nonlimiting examples, jointly with the figures which show:

FIG. 1, a schematic view of a furnace with a single burner shown, the flue gas analysis and burner control;

FIG. 2, a diagram explaining the Phases I and II of a method of the invention;

FIG. 3, a graph explaining the variations in (CO) as a function of time showing the phases (or sub-phases) of the method of the invention.

FIG. 1 is a schematic view of a furnace (cross section) and of the control system according to the invention.

A burner 10 creates a flame 2 which heats and melts the metal 3, in liquid form. The flue gases 4 issuing from the furnace 1 and produced by the combustion, particularly by the burner, are removed via the line 18, in which the CO and/or $H_2$ detectors 5 and 6 (known per se) are respectively placed, for measuring the CO and/or $H_2$ concentration in said flue gases. The signal issuing from each of the detectors 5 and 6 is transmitted via the connecting line to a control unit 8 of which the operation is explained below. The burner 10 is supplied respectively with oxidizer 13 and fuel 14 via controlled valves 12 and 11 respectively (mass flowmeters, for example) for delivering an appropriate flow rate of oxidizer and fuel to the burner. This flow rate is controlled by the control device 8, via the connecting line 15. The connecting lines 17 and 16 transmit the measurement of the opening of the valves 12 and 11 to the control system 8, which also receives data on the temperature of the molten metal 3 via a sensor. The control system 8 comprises an adjustment of the CO (and/or $H_2$) concentration setpoint, which can be modified as a function of time, particularly to go from the value C1 to the value C2.

According to whether the measurement of the CO and/or $H_2$ concentration transmitted by the sensors 5 and/or 6 to the control device 8 is higher or lower than said setpoint, it generates a control signal via the connection 15 to the controlled valves 12 and 11 which adjust the injection of oxidizer 13 and fuel 14 to obtain a decrease or increase in the carbon monoxide and/or hydrogen concentration in the flue gases.

FIG. 2 shows the typical variations of the ratio R (the flow rate of oxidizer or, preferably, the flow rate of fuel, is kept constant) and of the CO and/or $H_2$ concentration in the flue gases, in the context of the two-phase management of the melting cycle described above. During phase I, the CO and/or $H_2$ setpoint is set at the value of C1 of between 0.1 vol % and 5 vol %, whereas in phase II, this setpoint is adjusted to the value C2, substantially high, between 3 vol % and 15 vol %, with, in all cases, in the same successive cycle of phases I and II, C1=C2 and C1<C2 (if C1=C2, there would only be a single phase). As the melting begins, in order to servocontrol the CO and/or $H_2$ to the setpoint, the controller increases the value of the ratio R in order to supply excess oxidizer to burn the VOCs. The production of VOC by the charge and their combustion reaches a peak and then drops to zero at the end of phase I. The ratio R follows this trend by rising to a peak, denoted R_MAX, and then decreasing in phase I. Because of the setpoint C1, when the VOCs are almost entirely consumed, the ratio R necessarily and definitively passes through the threshold S, previously defined, and then drops to a minimum, denoted R_MIN. When the ratio R reaches the threshold S, a small quantity of VOC actually remains in the charge, generating a level of CO and/or $H_2$ lower than the setpoint C1. From this time on, the controller adjusts the ratio R, decreasing it further (production of CO and/or $H_2$ by the burner) to compensate for the deviation from this setpoint C1. All the VOCs are burnt when the ratio reaches R_MIN. It is then time to change the control strategy because phase II begins. The invention consists in using the time t1 of crossing the threshold S coupled with a detection time Δt of between 5% and 20% of the melting phase I considered (which terminates at time t1) to engender a change in control strategy, at time t2 defined by t2=t1+Δt. At this time, the setpoint becomes equal to C2.

According to a variant of the invention, it is possible, conversely, to detect the introduction of fresh materials into the furnace and to switch from the oxidation limitation phase to the VOC combustion phase. In fact, considering a charge of aluminum during phase II, charge-related VOCs are released and the controller adjusts the ratio R by increasing it (decreased production of CO and/or $H_2$ by the burner), to compensate for the deviation from this setpoint C2. Similarly, the ratio R exceeds the threshold S at a given time t3, indicating that the physical process is in phase I, so that the change in control strategy, ordered by the indicator, takes place at time t4 defined by t4=t3+Δt. At this time t4, the setpoint is therefore restored to the value C1 defined above. For the process control unit, the end of phase II is hence time t4.

EMBODIMENT

In a rotary furnace equipped with a 13 MW burner, 27 tonnes of salt and 27 tonnes of aluminum scrap are charged, the charge is heated until 2550 $Sm^3$ of natural gas are consumed, then 65 tonnes of aluminum scrap are again charged (beverage cans in this example) and the charge is heated until an additional 850 $Sm^3$ of natural gas are consumed. 35 tonnes of aluminum scrap (aluminum lathe turnings) are then again charged and the charge heated until an additional 1350 $Sm^3$ of natural gas are consumed, 99 tonnes of aluminum are then poured, the salts and dross present in the furnace are then heated until a total of 5500 $Sm^3$ of natural gas are consumed. The aluminum remaining in the furnace is then poured: 9 tonnes of aluminum.

FIG. 3 shows the variations in CO measured in the flue gases and the variations in the ratio R, defined above, during the melting of the two aluminum charges described above. In these curves, the effect of the automatic change in strategy is clearly observable. In fact, the indicator according to the invention actuates the mid-fusion phase change at time t2 because the first charge consists of painted beverage cans, hence with a high concentration of organic compounds. Furthermore, during the melting of the second charge, which is poorer in organic compounds (aluminum lathe turnings), the indicator controls the phase change at t'2 shortly after the phase begins, thereby optimizing the initiation of the control strategy adapted to phase II. This indicator serves to decrease the oxidation losses regardless of the type of charge entering the furnace, as shown by the table below:

| | Type of material charged | Unit | Method without control | Method according to the invention |
|---|---|---|---|---|
| Weight of oxidized aluminum | cans | kg | 1800 | 1750 |
| Weight of oxidized aluminum | turnings | kg | 2000 | 1750 |

The invention claimed is:

1. A method for processing aluminum in a furnace having at least first and second phases, in which an aluminum-containing material is introduced into the furnace, comprising:

melting the material by heating using at least one burner supplied with oxidizer and with fuel, in order to obtain molten aluminum:

measuring at least one of carbon monoxide CO and hydrogen $H_2$ concentration in at least one of a furnace atmosphere and flue gases, wherein the oxidizer supplied to at least one burner comprises over about 10% by volume of oxygen;

during the first phase, regulating at least one of the carbon monoxide and hydrogen concentration to a setpoint C1 of between about 0.1 vol % and about 5 vol % by varying the flow rate of the oxidizer or of the fuel; and decreasing oxidation of the molten aluminum in the second phase which is an oxidation limitation phase, during which (i) flow rate of the oxidizer is substantially constant while flow rate of the fuel injected into the at least one burner is a function of at least one of the carbon monoxide and hydrogen concentration in at least one of atmosphere or the flue gases or (ii) the flow rate of the fuel is substantially constant while the flow rate of the oxidizer is a function of at least one of the carbon monoxide and hydrogen concentration in at least one of the atmosphere and the flue gases, at least one of the carbon monoxide and hydrogen concentration being regulated upon the decreasing in the second phase to a setpoint C2 of between about 3 vol % and about 15 vol %, wherein the setpoint C1 is less than the setpoint C2.

2. The method of claim 1, wherein the oxidizer comprises over about 88 vol % of $O_2$.

3. The method of claim 1, wherein the oxidizer is industrially pure oxygen.

4. The method of claim 1, wherein the fuel is selected from natural gas, hydrocarbons, and light or heavy fuel oil.

5. The method of claim 1, wherein volumetric ratio of oxygen to fuel is maintained between about 1 and about 5.

6. The method of claim 1, wherein the carbon monoxide and/or hydrogen concentration is maintained substantially constant throughout this oxidation limitation phase at the setpoint C2.

7. The method of claim 1, wherein the oxidation limitation phase is preceded by a hydrocarbon combustion phase during which substantially all organic compounds present in the material are destroyed by pyrolysis.

8. The method of claim 7, wherein the hydrocarbon combustion phase is considered to terminate when a measured value of a ratio R of volumetric flow rate of oxygen to volumetric flow rate of fuel falls below a predefined value S.

9. The method of claim 8, wherein a stabilization phase takes place with a measured CO and/or $H_2$ concentration regulated to the setpoint C1, this phase terminating when the ratio R reaches its minimum.

10. The method of claim 1, wherein the oxidation limitation phase terminates with the reintroduction, into the furnace, of a new charge of aluminum-containing material.

11. The method of claim 1, wherein the CO concentration is measured using a laser diode.

12. The method of claim 1, wherein volumetric ratio of oxygen to fuel is maintained between about 1.5 and about 3.

13. The method of claim 1, wherein the the setpoint C2 is between about 6 vol % and about 10 vol %.

14. A method of processing aluminum in a furnace, in which an aluminum-containing material is introduced into the furnace, comprising:

melting the material by heating using at least one burner supplied with oxidizer and with fuel, in order to obtain molten aluminum;

measuring at least one of carbon monoxide CO and hydrogen H2 concentration in at least one of a furnace atmosphere and flue gases, wherein the oxidizer supplied to at least one burner comprises over about 10% by volume of oxygen;

regulating at least one of the carbon monoxide and hydrogen to a setpoint C1 while the molten aluminum is maintained in a first phase, wherein regulating to the setpoint C1 comprises (i) adjusting flow rate of the fuel injected into the at least one burner as a function of at least one of the carbon monoxide and hydrogen concentration in at least one of the atmosphere and the flue gases while flow rate of the oxidizer is substantially constant or (ii) adjusting the flow rate of the oxidizer as a function of at least one of the carbon monoxide and hydrogen concentration in at least one of the atmosphere and the flue gases while the flow rate of the fuel is substantially constant, wherein C1 is between about 0.1 vol % and about 5 vol %; and regulating at least one of the carbon monoxide and hydrogen to a setpoint C2 while oxidation of the molten aluminum is decreased in a second phase, wherein regulating to the setpoint C2 comprises (i) adjusting the flow rate of the fuel injected into the at least one burner as function of at least one of the carbon monoxide and hydrogen concentration in at least one of the atmosphere and the flue gases while the flow rate of the oxidizer is substantially constant or (ii) adjusting the flow rate of the oxidizer as a function of at least one of the carbon monoxide and hydrogen concentration in at least one of the atmosphere and the flue gases while the flow rate of the fuel is substantially constant, wherein the setpoint C2 is greater than the setpoint C1 and is between about 3 vol % and about 15 vol %.

* * * * *